(12) United States Patent
Althoff et al.

(10) Patent No.: US 12,157,481 B2
(45) Date of Patent: Dec. 3, 2024

(54) SYSTEMS AND METHODS FOR HYBRID OPEN-LOOP AND CLOSED-LOOP PATH PLANNING

(71) Applicant: FORD GLOBAL TECHNOLOGIES, LLC, Dearborn, MI (US)

(72) Inventors: Daniel Althoff, Bavaria (DE); Andreas Joachim Knoblach, Munich (DE); Scott Julian Varnhagen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 17/805,077

(22) Filed: Jun. 2, 2022

(65) Prior Publication Data

US 2023/0391350 A1 Dec. 7, 2023

(51) Int. Cl.
*B60W 50/04* (2006.01)
*B60W 50/038* (2012.01)
*B60W 60/00* (2020.01)
*B60W 50/00* (2006.01)

(52) U.S. Cl.
CPC ........ *B60W 50/045* (2013.01); *B60W 50/038* (2013.01); *B60W 60/001* (2020.02); *B60W 2050/0008* (2013.01); *B60W 2050/0012* (2013.01)

(58) Field of Classification Search
CPC ............. B60W 50/045; B60W 50/038; B60W 60/001; B60W 2050/0008; B60W 2050/0012
See application file for complete search history.

(56) References Cited

U.S. PATENT DOCUMENTS

| | | | |
|---|---|---|---|
| 9,244,462 | B2 | 1/2016 | Pedersen |
| 2009/0076702 | A1 | 3/2009 | Arbitmann et al. |
| 2017/0080952 | A1 | 3/2017 | Gupta et al. |
| 2018/0307236 | A1 | 10/2018 | Reed |
| 2019/0018412 | A1 | 1/2019 | Tschanz et al. |
| 2019/0064825 | A1 | 2/2019 | Tschanz et al. |
| 2019/0121362 | A1 | 4/2019 | Russell et al. |
| 2019/0317516 | A1* | 10/2019 | Zhu ........................ G01C 21/26 |

(Continued)

OTHER PUBLICATIONS

U.S. Appl. No. 17/071,140, filed Oct. 15, 2020, System For Anticipating Future State of an Autonomous Vehicle.

(Continued)

*Primary Examiner* — Yuen Wong
(74) *Attorney, Agent, or Firm* — Frank A. Mackenzie; Brooks Kushman P.C.

(57) ABSTRACT

Disclosed herein are systems, methods, and computer program products for vehicle path planning. The methods comprise: estimating a current state of a vehicle based on sensor data; generating a control error representing a difference between the estimated current state of the vehicle and a desired state of the vehicle as described by a previously published trajectory; comparing the control error to a threshold value; generating a first plan for the vehicle using an open-loop path planning approach when the control error is below the threshold value or a second plan for the vehicle using a closed-loop path planning approach when the control error is above the threshold value; and causing the vehicle to execute the first or second plan.

19 Claims, 9 Drawing Sheets

(56) References Cited

U.S. PATENT DOCUMENTS

2019/0369637 A1   12/2019  Shalev-Shwartz et al.
2020/0064851 A1    2/2020  Wilkinson
2020/0117187 A1    4/2020  Kothari
2020/0117199 A1    4/2020  Akella et al.
2020/0257317 A1    8/2020  Musk et al.
2021/0271252 A1    9/2021  Zhao et al.
2022/0121201 A1    4/2022  Williams et al.

OTHER PUBLICATIONS

Hoermann, S. et al., "Probabilistic long-term prediction for autonomous vehicles", 2017 IEEE Intelligent Vehicles Symposium (IV), Los Angeles, CA, 2017, pp. 237-243, available at: https://ieeexplore.ieee.org/document/7995726.

\* cited by examiner

SYSTEMS AND METHODS FOR HYBRID OPEN-LOOP AND CLOSED-LOOP PATH PLANNING

BACKGROUND

Modern day vehicles have at least one on-board computer and have internet/satellite connectivity. The software running on these on-board computers monitor and/or control operations of the vehicles. The vehicle also comprises monocular or stereo cameras and/or lidar detectors for detecting objects in proximity thereto. The cameras capture images of a scene. The lidar detectors generate lidar datasets that measure the distance from the vehicle to an object at a plurality of different times. These images and distance measurements can be used for detecting and tracking movements of the object, making predictions as to the object's trajectory, and planning paths of travel for the vehicle based on the object's predicted trajectory. When traversing roads, the vehicle should yield to objects (for example, pedestrians and other animals) that intend to cross the same.

Typical vehicle hierarchical path planning systems typically have a path-planner system that plans a trajectory starting from a given starting point for a path-follower system to follow. The path planning problem is often repeated periodically such that the plan can be updated as new information becomes available from the perception/tracking/predictions systems of the vehicle, and also to account for errors in the path following/physical vehicle systems from perfectly following the planned path of travel. The path planning problem can generate path plans from two starting points: (1) an estimated actual vehicle state (for example, position/velocity/acceleration/other information) of the vehicle; and (2) expected vehicle state (for example, position/velocity/acceleration/other information) of the vehicle as described by a previous trajectory.

Approach (1) is referred to herein as a closed-loop plan since the path-planner system is "closing the loop" on the estimated state of the vehicle by incorporating state feedback in its plan. If the path-planner system is latent (i.e., it takes considerable time to generate a plan), the closed-loop planning process can initiate from where the vehicle is likely to be at the time when the plan will be published for execution. An illustrative closed-loop planning approach is described in U.S. patent application Ser. No. 17/071,140 which was filed on Oct. 15, 2020 ("the '140 Application") and published with U.S. Patent Publication No. 2022/0121201 on Apr. 21, 2022. The contents of these patent documents are incorporated herein by reference in their entireties. All closed-loop planning approaches have the same thing in common: measurements inform an estimate of the vehicle state (position/velocity/acceleration) from which the plan is initiated.

Approach (2) is referred to herein as an open-loop plan since the path-planner system does not utilize feedback (measurements) from the actual state of the vehicle when identifying its initial planning state. The previous trajectory comprises a planned spatial path of the vehicle, including how far along the path the vehicle should be as time evolves.

The plans (trajectories) generated by the path-planner system are then published to a path-follower system. The path-follower system publishes longitudinal and lateral commands (for example, a longitudinal torque request and/or a steering wheel angle request) to a vehicle platform, attempting to pilot the vehicle accurately along the trajectory. The path-follower system: (a) estimates the vehicle's state relative to the trajectory (where an error between the estimated state and the desired state (as described by the trajectory) is termed control error); and (b) utilizes closed-loop controllers to issue commands to attempt to reduce the control error. The path-follower system will often execute at a higher frequency (for example, more frequently) then the path-planner system.

Both open-loop plan and closed-loop plan approaches have their merits (or advantages) and demerits (or disadvantages). With regard to the open-loop plan, a control error is generated when the vehicle does not perfectly follow the published trajectory. This is because the estimated vehicle state and the expected vehicle state differ. The generated trajectory will then be offset from the vehicle state and the path-follower system works to reduce the resulting control error via closed-loop control strategies. It is generally expected that the vehicle will not perfectly follow published trajectories due to disturbances. Disturbances can include: external disturbances, for example: wind gusts, slippery road surfaces; and model mismatch, for example: the vehicle powertrain not behaving exactly as expected.

The advantages of the open-loop plan approach include an ability to allow the control error to be generated which incentivizes the path-follower system to augment actuation requests made to the vehicle platform in order to minimize this control error. If the control error was due to a disturbance, the path-follower system will work to correct for or "overcome" this disturbance. This is termed "disturbance robustness" in control theory. If unexpectedly large control error is observed, it is clear that the vehicle is unable to follow the desired path. Mitigating strategies such as stopping the vehicle safely can then be executed.

Because the onus is on the path-follower system to be robust to the aforementioned disturbances, the path planner needs not consider them. This is especially relevant during design verification of the vehicle systems. Said another way, robustness to these disturbances need only be tested at the path follower level of the software stack. The path planning stack can be verified without considering these disturbances, which vastly reduces the verification burden. Verification of the path planning and the following system can be handled separately.

The disadvantages of the open-loop plan approach include significant differences between the planned path of the vehicle and the path the vehicle will actually achieve, when the control error grows large enough. This can be problematic in that the planned path may avoid intersecting other objects (road boundary, static obstacles, dynamic obstacles), but the actual path the vehicle will execute may not.

If the control error grows large enough, following the open-loop planned trajectory may not be feasible. For example, if the vehicle is cornering and encounters unanticipated ice and begins to slide, the best action may be to plan to stop while straightening out, as opposed to continuing to attempt to make an infeasible turn. Because the open-loop planner does not plan from the estimated actual vehicle state it is unable to generate such contingency plans.

With regard to the closed-loop plan, the closed-loop planner generates plans (trajectories) which initiate at the estimated state of the vehicle. Said another way, the closed-loop plans explicitly minimize control error by attempting to place the trajectory near to where the vehicle will be when the path follower begins acting upon it. If a disturbance causes the vehicle to deviate from the previously published trajectory, the next trajectory published by the closed-loop planner will "move" to be near to the current state of the vehicle.

The advantages of the closed-loop plan approach include always initiating the trajectory near the actual state of the vehicle. In effect, the trajectory is a best guess at how the vehicle will actually travel along the trajectory. In this way, if the closed-loop planned trajectory avoids conflict with objects (road boundary, static obstacles, dynamic obstacles), is it likely that the vehicle will also avoid such conflict while following the path. If very large disturbances (for example, sliding on unanticipated ice) push the vehicle away from the intended path, the closed-loop plan will continue to provide the most feasible possible path given the actual state of the vehicle. This will allow the vehicle to gracefully recover from such a disturbance event.

The disadvantages of the closed-loop plan approach include a minimization of control error regardless how well the path follower and vehicle platform perform relative to the planned path. In this way, the path follower cannot reject disturbances on its own. The path planner is a part of the feedback loop in rejecting such disturbances. This means that if a disturbance pushes the vehicle off of the planned path and towards an obstacle, the path planner must plan increasingly "stiff" paths to steer the vehicle away from the obstacle. In this way, it is not sufficient to verify the path follower's robustness to disturbances. The full path planning and path following software stack must be tested in such situations. This significantly increases the design verification burden of the software stack, as the path planner responds differently depending on context (for example, it will respond more stiffly if a disturbance pushes the vehicle towards an obstacle, as compared to if the disturbance pushes the vehicle towards empty space). The combinatorial nature of the joint verification of the path planner and path follower is potentially intractable. Without a control error being generated, it is complicated to determine whether the path follower and vehicle platform are performing as expected or not. For example, there is no straightforward metric to understand whether the vehicle is biasing leftward unexpectedly.

This document describes methods and systems that are directed to addressing the problems described above, and/or other issues.

SUMMARY

The present disclosure concerns implementing systems and methods for vehicle path planning. The method comprises performing the following operations by a computing device: estimating a current state of a vehicle based on sensor data; generating a control error representing a difference between the estimated current state of the vehicle and a desired state of the vehicle as described by a previously published trajectory; comparing the control error to a threshold value; generating a first plan for the vehicle using an open-loop path planning approach when the control error is below the threshold value or a second plan for the vehicle using a closed-loop path planning approach when the control error is above the threshold value; and causing the vehicle to execute the first or second plan.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1:
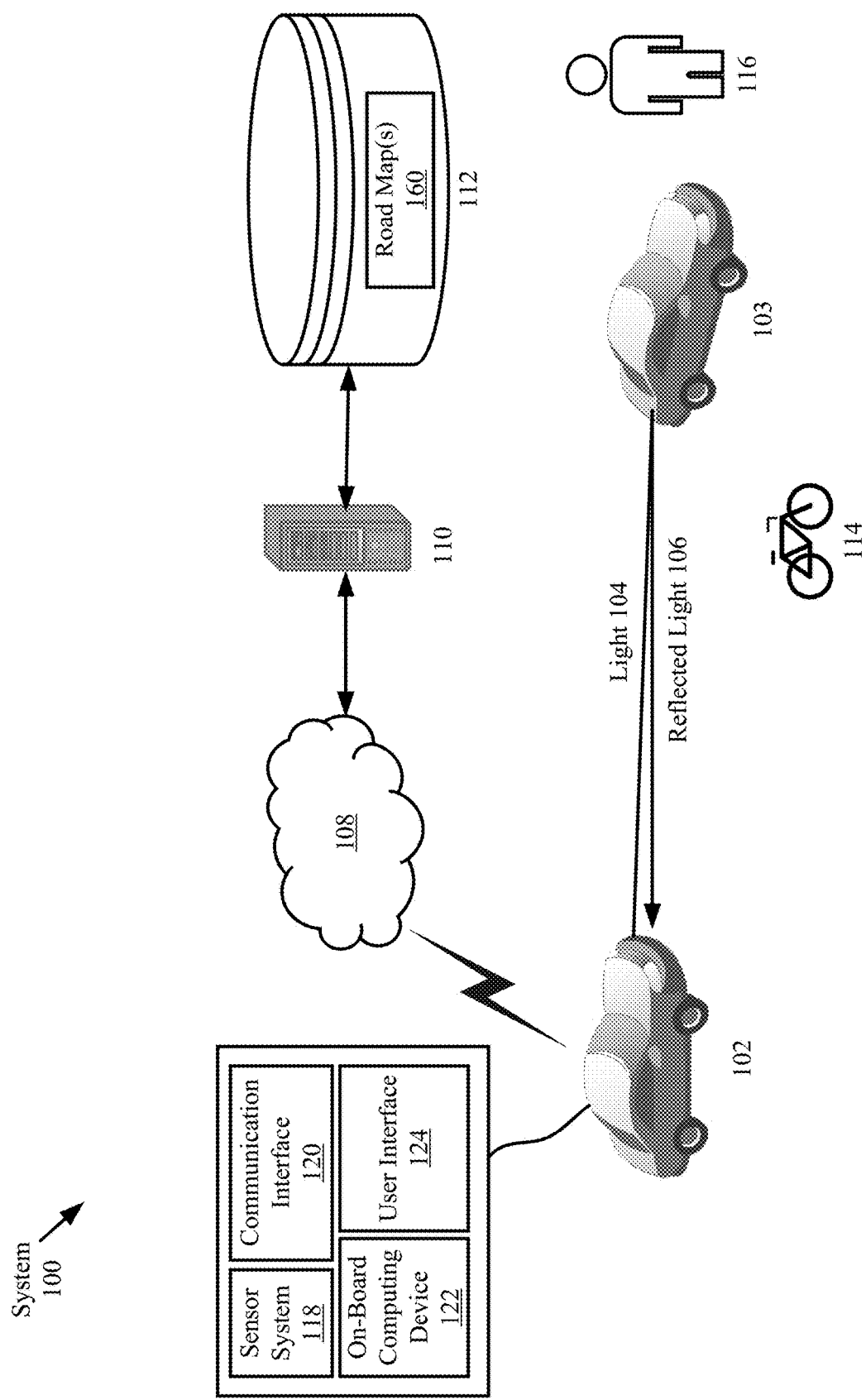
FIG. 1 is an illustration of an illustrative system.

As noted above, there are advantages and disadvantages associated with the open-loop vehicle trajectory planning approach and the closed-loop vehicle trajectory planning approach. The present solution provides a hybrid open-loop/closed-loop technique which improves trajectory planning for autonomous vehicles (AVs) while obtaining the advantages of both approaches and avoiding the disadvantages of both approaches. This allows for a simpler vehicle design verification strategy because the merits of the open-loop planning approach can be leveraged. The present solution improves an AV's ability to detect when it is not performing as expected due to disturbances and to be brought to a stop in a comfortable, safe and effective manner when such detection is made. Thus, the AV is more able to overcome unanticipated disturbances (for example, patches of ice and/or tire blowout) as compared to conventional autonomous vehicles that use either an open-loop planner or a closed-loop planner.

The present solution generally concerns implementing systems and methods for improved vehicle trajectory planning. The methods involve: obtaining sensor data and a published trajectory for a vehicle; estimating a current state of a vehicle based on the sensor data; generating a control error representing a difference between the estimated current state of the vehicle and a desired state of the vehicle as described by the previously published trajectory; comparing the control error to a threshold value; generating a first plan for the vehicle using an open-loop path planning approach when the control error is below the threshold value or a second plan for the vehicle using a closed-loop path planning approach when the control error is above the threshold value; and/or causing the vehicle to execute the first or second plan.

In some scenarios, the methods also involve performing operations by the computing device to conclude that it is or is not acceptable for the vehicle to proceed with normal operations based on characteristics of disturbance(s) to which the vehicle has been exposed. The computing device may conclude that it is not acceptable to proceed with normal operations when the disturbance(s) comprise(s) (i) a temporary egregious disturbance resulting in an exceptionally large control error (i.e., a control error greater than an expected value by a pre-defined amount) and/or (ii) a persistent disturbance resulting in a failure of the vehicle to achieve nominal performance. The second plan may be intended to cause the vehicle to stop when the computing device concludes that it is not acceptable for the vehicle to proceed with normal operations.

The computing device may conclude that it is acceptable to proceed with normal operations when the disturbance(s) comprise(s) a temporary mild disturbance impacting performance of the vehicle that is expected to recover to nominal in a given amount of time. The terms "nominal" and "nominal performance" as used here means an operating level at which a device is designed to operate. The phrase "recover to nominal" as used here refers to operation(s) transitioning or otherwise returning to level(s) at which a device is designed to operate. The term "temporary mild disturbance" refers to a disturbance that lasts a limited period of time or less than a pre-defined duration (for example, less than or equal to 30 seconds). The temporary mild disturbance is distinguishable from a persistent mild disturbance. The term "persistent mild disturbance" refers to a disturbance that exits for a prolonged period of time (e.g., greater than 30 seconds). A temporary mild disturbance can include, but is not limited to, a side wind gust. A persistent mild disturbance can include, but is not limited to, low tire pressure. A mild disturbance is absent of an egregious disturbance. An egregious disturbance can result in an exceptionally large control error (i.e., a control error greater than an expected value by a pre-defined amount) and/or result in a failure of the vehicle to achieve nominal performance. The egregious disturbance can be temporary or persistent. A temporary egregious disturbance refers to a disturbance that exits for a limited period of time (for example, less than or equal to 30 seconds). A persistent egregious disturbance refers to a disturbance that exits for a prolonged period of time (for example, greater than 30 seconds). A temporary egregious disturbance can include, but is not limited to, a patch of ice. A persistent egregious disturbance can include, but is not limited to, a tire blow out. The second plan may be configured to cause the vehicle to continue traveling with or without stopping when the computing device concludes that it is acceptable for the vehicle to proceed with normal operations.

The above-described hybrid approach of the present solution achieves the advantages of both the open-loop and closed-loop plan generation approaches, while avoiding the disadvantages of these approaches. The end result is a path planning architecture which is robust to nominal or short duration disturbances, robust to egregious or long duration disturbances (while allowing their detection and mitigation via stopping the vehicle), and more easily verified than closed-loop planning systems.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, the present solution is being described herein in the context of autonomous vehicles. However, the present solution is not limited to autonomous vehicle applications. The present solution can be used in other applications such as robotic application (for example to control movements of articulating arms) and/or system performance applications.

FIG. 1 illustrates an example system 100, in accordance with aspects of the disclosure. System 100 comprises a vehicle 102 which is caused to travel along a road in a semi-autonomous or autonomous manner. Vehicle 102 is also referred to herein as an AV 102. The AV 102 can include, but is not limited to, land vehicles (as shown in FIG. 1), aircraft, watercraft, subterrenes, spacecraft, drones and/or an articulating arm (for example, with a gripper at a free end). As noted above, except where specifically noted this disclosure is not necessarily limited to AV embodiments, and it may include non-autonomous vehicles in some embodiments.

AV 102 is generally configured to detect objects 103, 114, 116 in proximity thereto. The objects can include, but are not limited to, a vehicle 103, a cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. AV 102 may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 2:
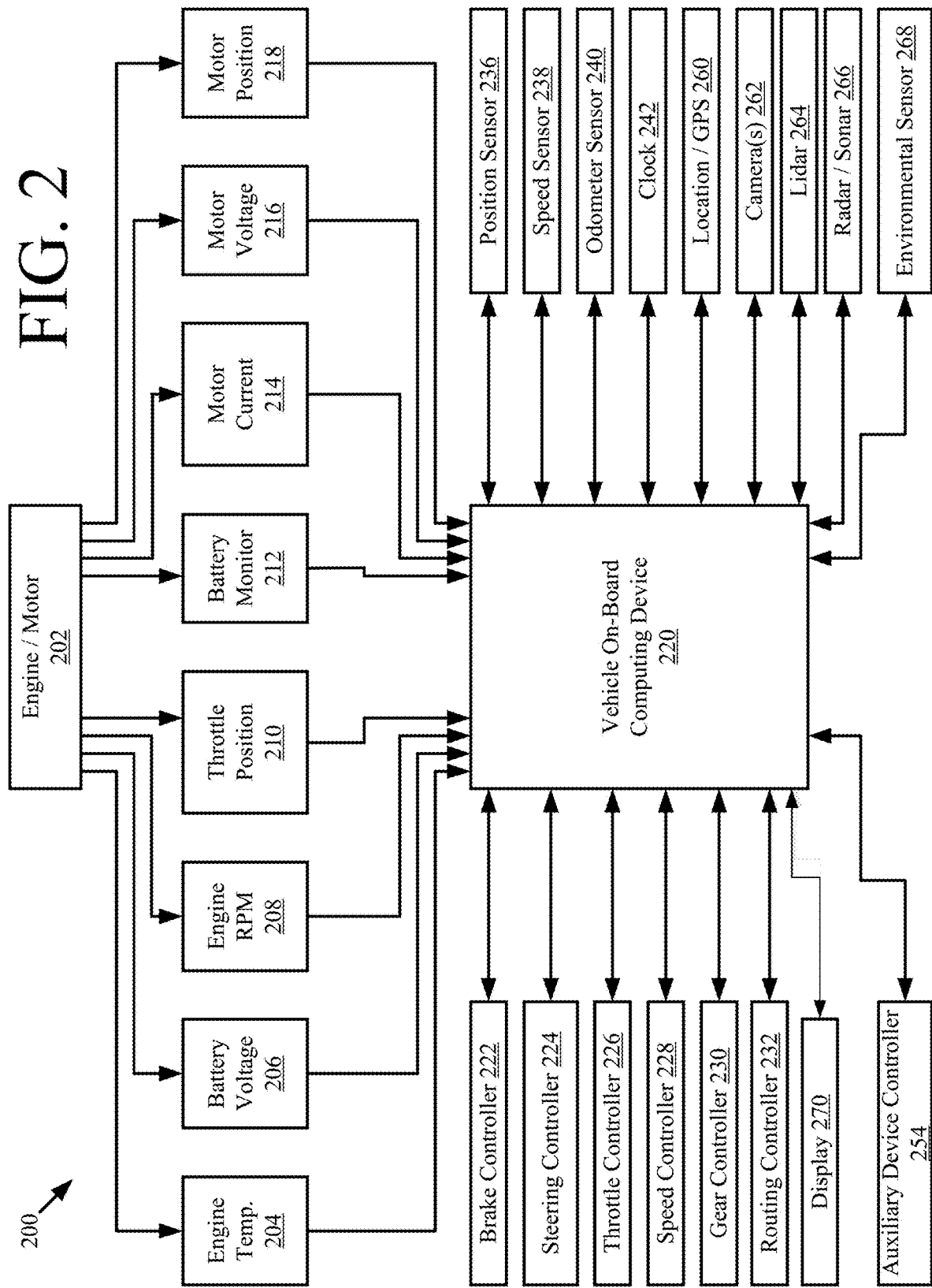
FIG. 2 is an illustration of an illustrative architecture for a vehicle.

The sensor system 118 may include one or more sensors that are coupled to and/or are included within the AV 102, as illustrated in FIG. 2. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), wheel speed sensors, etc.), humidity sensors, occupancy sensors, and/or the like. The sensors are generally configured to generate sensor data. The sensor data can include information that describes the location of objects within the surrounding environment of the AV 102, information about the environment itself, information about the motion of the AV 102, information about a route of the vehicle, and/or the like. As AV 102 travels over a surface (for example, a road), at least some of the sensors may collect data pertaining to the surface.

As will be described in greater detail, AV 102 may be configured with a lidar system (for example, lidar system 264 of FIG. 2). The lidar system may be configured to transmit a light pulse 104 to detect objects located within a distance or range of distances of AV 102. Light pulse 104 may be incident on one or more objects (for example, AV 103) and be reflected back to the lidar system. Reflected light pulse 106 incident on the lidar system may be processed to determine a distance of that object to AV 102. The reflected light pulse 106 may be detected using, in some scenarios, a photodetector or array of photodetectors positioned and configured to receive the light reflected back into the lidar system. Lidar information, such as detected object data, is communicated from the lidar system to the on-board computing device 122. The AV 102 may also communicate lidar data to a remote computing device 110 (for example, a cloud processing system) over a network 108. Computing device 110 may be configured with one or more servers to process one or more processes of the technology described herein. Computing device 110 may also be configured to communicate data/instructions to/from AV 102 over network 108, to/from server(s) and/or database(s) 112.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from the database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

As noted above, the AV 102 may detect objects 103, 114, 116 in proximity thereto. Such object detections are facilitated using the sensor data generated by the sensor system 118 (for example, lidar datasets generated by an onboard lidar detector). The sensor data is processed by the onboard computing device 122 of the AV 102 and/or by the remote computing device 110 to obtain one or more predicted trajectories for the object given the sensor data. The predicted trajectories for the object may then be used to generate a trajectory for the AV 102. The AV 103 may then be caused by the on-board computing device to follow the trajectory.

FIG. 2 illustrates a system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, the system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Revolutions Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 220, it may be a separate device, or multiple clocks may be available.

The vehicle also will include various sensors that operate to gather information about the environment in which the vehicle is traveling. These sensors may include, for example: a location sensor 260 (for example, a GPS device); object detection sensors such as one or more cameras 262; a lidar sensor system 264; and/or a RADAR and/or SONAR system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 4. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 270 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In some scenarios, the vehicle on-board computing device 220 may determine perception information of the surrounding environment of the vehicle. Based on the sensor data provided by one or more sensors and location information that is obtained, the vehicle on-board computing device 220 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 220 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 220 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle. pedestrian, bicycle, static object, or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In those or other scenarios, the vehicle on-board computing device 220 may determine a motion plan for the vehicle. For example, the vehicle on-board computing device 220 may determine a motion plan for the vehicle based on the perception data and/or the prediction data. Specifically, given predictions about the future locations of proximate objects and other perception data, the vehicle on-board computing device 220 can determine a motion plan for the vehicle that best navigates the vehicle relative to the objects at their future locations.

In those or other scenarios, the vehicle on-board computing device 220 may receive predictions and make a decision regarding how to handle objects and/or actors in the environment of the vehicle. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the vehicle to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the vehicle is generated for execution. The vehicle on-board computing device 220 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 3:
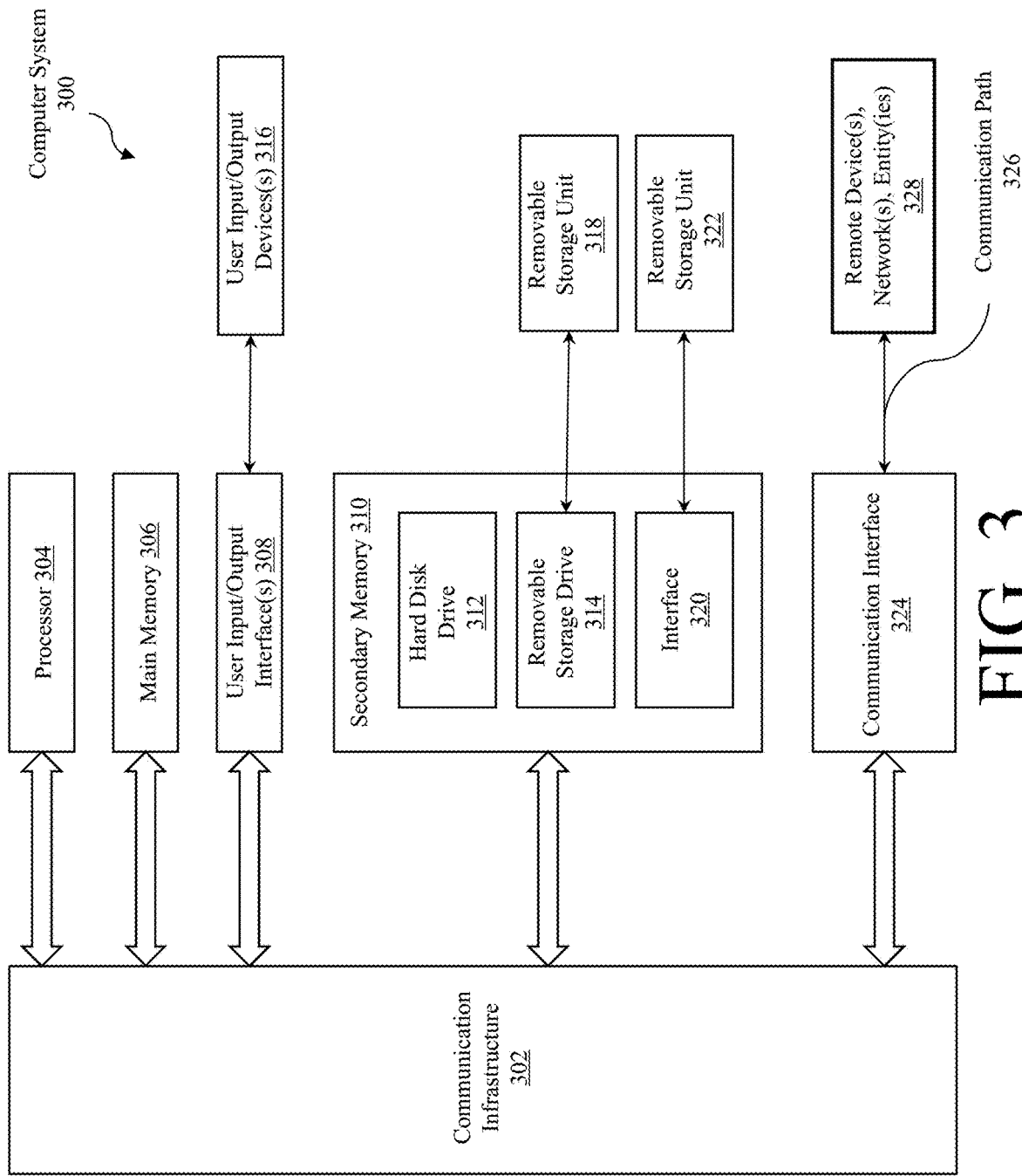
FIG. 3 is an illustration of an illustrative computing device.

The present solution can be implemented, for example, using one or more computer systems, such as computer system 300 shown in FIG. 3. Computer system 300 can be any computer capable of performing the functions described herein. The on-board computing device 122 of FIG. 1, computing device 110 of FIG. 1, robotic device(s) 152 of FIG. 1, mobile communication device(s) 156 of FIG. 1, and/or the vehicle on-board computing device 220 of FIG. 2 may be the same as or similar to computing system 300. As such, the discussion of computing system 300 is sufficient for understanding the devices 110, 122, 152, 156 and 220 of FIGS. 1-2.

Computing system 300 may include more or less components than those shown in FIG. 3. However, the components shown are sufficient to disclose an illustrative solution implementing the present solution. The hardware architecture of FIG. 3 represents one implementation of a representative computing system configured to operate a vehicle, as described herein. As such, the computing system 300 of FIG. 3 implements at least a portion of the method(s) described herein.

Some or all components of the computing system 300 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 300 includes one or more processors (also called central processing units, or CPUs), such as a processor 304. Processor 304 is connected to a communication infrastructure or bus 302. One or more processors 304 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 316, such as monitors, keyboards, pointing devices, etc., that communicate with communication infrastructure 302 through user input/output interface(s) 308. Computer system 300 further includes a main or primary memory 306, such as random access memory (RAM). Main memory 306 may include one or more levels of cache. Main memory 306 has stored therein control logic (i.e., computer software) and/or data.

One or more secondary storage devices or memories 310 may be provided with computer system 300. Secondary memory 310 may include, for example, a hard disk drive 312 and/or a removable storage device or drive 314. Removable storage drive 314 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 314 reads from and/or writes to removable storage unit 314 in a well-known manner.

In some scenarios, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 300, main memory 306, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 3. In particular, the present solution can operate with software, hardware, and/or operating system implementations other than those described herein.

Figure 4:
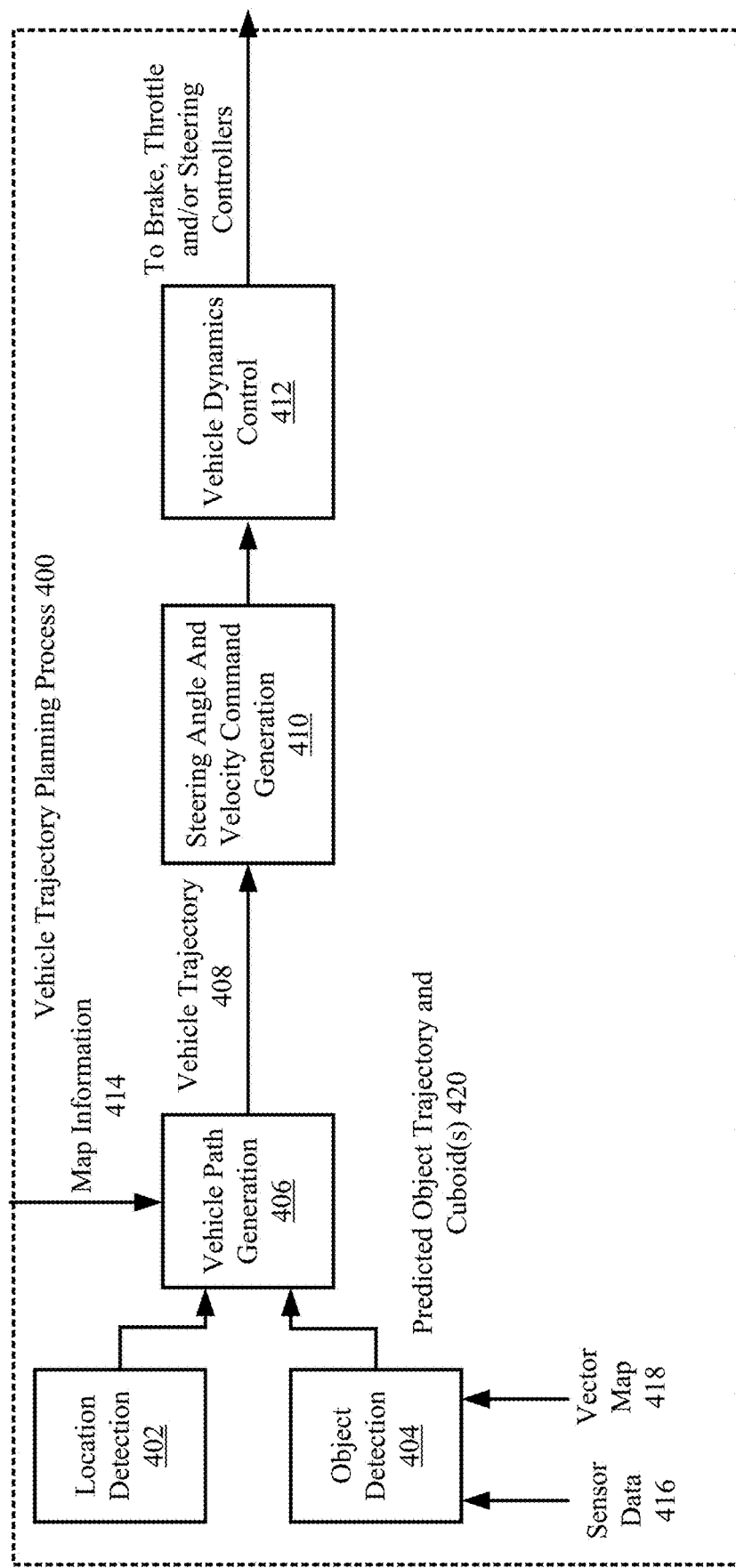
FIG. 4 provides a block diagram of an illustrative vehicle trajectory planning process.

FIG. 4 provides a block diagram that is useful for understanding how motion or movement of an AV is achieved in accordance with the present solution. All of the operations performed in blocks 402-412 can be performed by the on-board computing device (for example, on-board computing device 122 of FIGS. 1 and/or 220 of FIG. 2) of a vehicle (for example, AV 102 of FIG. 1).

In block 402, a location of the AV (for example, AV 102 of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 406.

In block 404, an object (for example, vehicle 103 of FIG. 1) is detected within proximity of the AV (for example, <100+ meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 404 for the object. The object's trajectory is predicted in block 404 based on the object's class, cuboid geometry(ies), cuboid heading(s) and/or contents of a map 418 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 418 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 420 specifying the object's predicted trajectory, the cuboid geometry(ies)/heading(s) is provided to block 406. In some scenarios, a classification of the object is also passed to block 406. In block 406, a vehicle trajectory is generated using the information from blocks 402 and 404. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 420 can be determined based on the location information from block 402, the object detection information from block 404, and/or map information 414 (which is pre-stored in a data store of the vehicle). The map information 414 may include, but is not limited to, all or a portion of road map(s) 160 of FIG. 1. The vehicle trajectory 420 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 420 is then provided to block 408.

In block 410, a steering angle and velocity command is generated based on the vehicle trajectory 420. The steering angle and velocity command are provided to block 410 for vehicle dynamics control, i.e., the steering angle and velocity command causes the AV to follow the vehicle trajectory 408.

Figure 5:
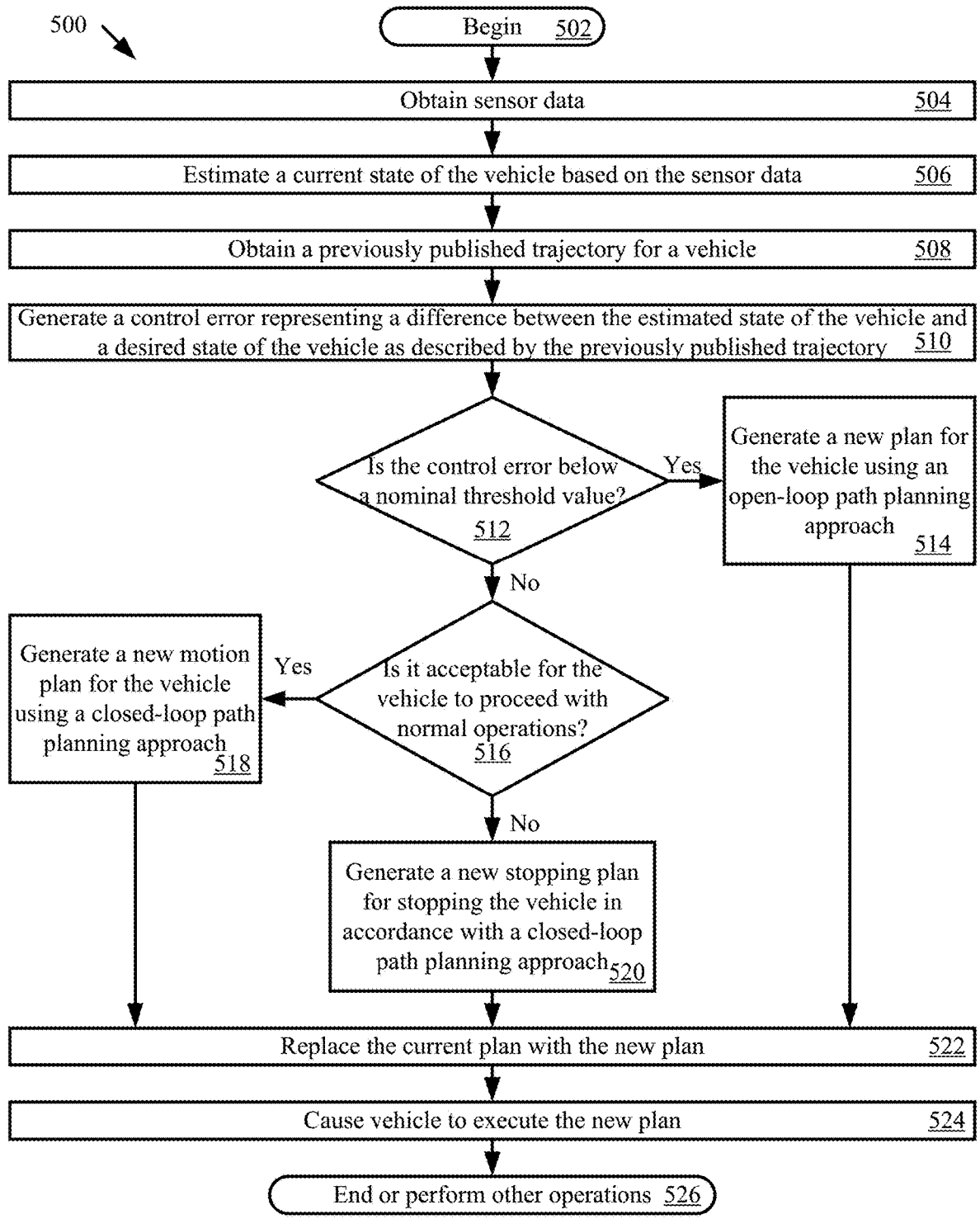
FIG. 5 provides a flow diagram of an illustrative method for vehicle path planning in accordance with a hybrid open-loop and closed-loop approach.

FIG. 5 provides a flow diagram of an illustrative method 500 for vehicle path planning in accordance with a hybrid open-loop and closed-loop approach. Method 500 can be performed at least partially by an on-board computing device (for example, on-board computing device 122 of FIG. 1 and/or vehicle on-board computing device 220 of FIG. 2) of a vehicle (for example, vehicle 102 of FIG. 1) and/or another computing device (for example, server 110 of FIG. 1 and/or computer system 300 of FIG. 3).

Method 500 begins with 502 and continues with 504 where the computing device obtains sensor data generated by sensor(s) (for example, sensor system 118 of FIGS. 1 and/or 236-240, 260-268 of FIG. 2) of the vehicle. The sensor data can include, but is not limited to, motion sensor data (for example, wheel speed data and/or IMU data), vehicle position data, environmental data, and/or the like.

The computing device processes the sensor data in 506 to obtain an estimate of a current state of the vehicle. The current state of the vehicle can include one or more estimated state sub-values expressed in two to six degrees of freedom. The estimated state sub-value(s) can include, but is(are) not limited to, a vehicle position (for example, an x-coordinate and a y-coordinate), an orientation (or yaw), a yaw rate, pitch rate, roll rate, a longitudinal velocity, a lateral velocity, a vertical velocity, a rotational velocity, a longitudinal acceleration, a lateral acceleration, a vertical acceleration, an angular acceleration, a longitudinal distance traveled along a path, a lateral offset (i.e., lateral distance between vehicle and the spatial path), a heading offset (i.e., yaw offset between vehicle and the spatial path), and/or vehicle component state(s) (for example, an actuator position and/or a battery charge level).

Next in 508, the computing device obtains a previously published trajectory for the vehicle from a datastore (for example, memory 306 and/or 310 of FIG. 3) of an onboard computing device (for example, vehicle on-board computing device 220 of FIG. 2). The previously published trajectory is used by the computing device in 510 to generate a control error. The control error represents a difference between the estimated state of the vehicle and a desired state of the vehicle as described by the previously published trajectory. The control error can be generated by comparing estimated current state value(s) of the vehicle and desired state value(s) of the vehicle. For example, an estimated vehicle longitudinal velocity is compared to a desired vehicle longitudinal velocity, an estimated longitudinal acceleration for the vehicle is compared to a desired longitudinal acceleration for the vehicle, an estimated longitudinal distance traveled along a path is compared to a desired longitudinal distance traveled along a path, an estimated lateral offset may optionally be compared to a desired lateral offset, an estimated vehicle position is compared to a desired vehicle position, an estimated yaw is compared to a desired yaw, an estimated yaw rate is compared to desired yaw rate, and/or an estimated vehicle orientation is compared to a desired vehicle orientation. The present solution is not limited to the particulars of this example. The comparison operations can specify, for example, Euclidean/Cartesian Distances and/or differences in Frenet frames.

The control error may comprise a single error value E or a set of error values $[e_1, e_2, \ldots, e_N]$. In the later case, the error values of the set may be combined to generate a combined error value C. The error values can be combined with each other in any manner suitable for a given application. For example, the error values may be weighted, added, averaged, subtracted and/or multiplied. One illustrative mathematical equation (1) describing the combined error value C is provided below.

$$C = ((w_1 \cdot e_1) + (w_2 \cdot e_2) + \ldots + (w_N \cdot e_N))/N \tag{1}$$

where $w_1, w_2, \ldots w_N$ are weighs and N is an integer. The weights can be pre-defined or dynamically selected based on certain criteria such as current road conditions, current weather conditions, geographic location of the vehicle and/or time of day.

In 512, the computing device compares the control error to a nominal threshold value $thr_{nominal}$ (for example, a number from 0-100 based on the given sub-value). Any of the above-mentioned control error values $E, C, e_1, e_2, \ldots$, and/or $e_N$ can be checked against a nominal threshold value. For example, checking a longitudinal velocity control error may be defined by the following mathematical equation (2).

$$|v_{estimated} - v_{expected}| \to thr_{nominal\text{-}velocity} \tag{2}$$

where $v_{estimated}$ represents an estimated longitudinal velocity for the vehicle (for example, in meters per second (m/s)), $v_{expected}$ represents an expected longitudinal velocity for a vehicle (for example, in meters per second), and $thr_{nominal\text{-}velocity}$ represents a nominal threshold value for longitudinal velocity. $thr_{nominal\text{-}velocity}$ can have a value between 0 and 10 m/s (for example, 1 m/s). The threshold value can have any value selected in accordance with a given application. For example, a nominal threshold value for longitudinal accelerations can be 0.5 m/s$^2$, a nominal threshold value for longitudinal distance along a path can be 0.35 m, a nominal threshold value for lateral offset can be 0.25 m, a nominal threshold value for yaw offset can be 5.0°, and a nominal threshold value for yaw rate can be 1.0 deg./sec. The present solution is not limited to the particulars of these examples.

As shown by [512:YES], method 500 continues with 514 when the control error value E is equal to or greater than the nominal threshold value, the combined control error value C is equal to or greater than the nominal threshold value, and/or at least one of the control error values $e_1, e_2, \ldots, e_N$ of the set is equal to or greater than a respective one of a plurality of nominal threshold values. In this case, the vehicle is accurately following the previously planned path and it is deemed acceptable to proceed with normal operations. Avoiding exceeding the nominal threshold value(s) is achievable when the path follower and vehicle platform operate correctly and disturbances are of a type to which the path follower is robust. The processes of 514 also involve generating a new plan for the vehicle using an open-loop path planning approach. Any known or to be known open-loop path planning approach can be used here. The new plan generated in 514 should initiate at the expected vehicle state based on the previously published trajectory.

Figure 6:
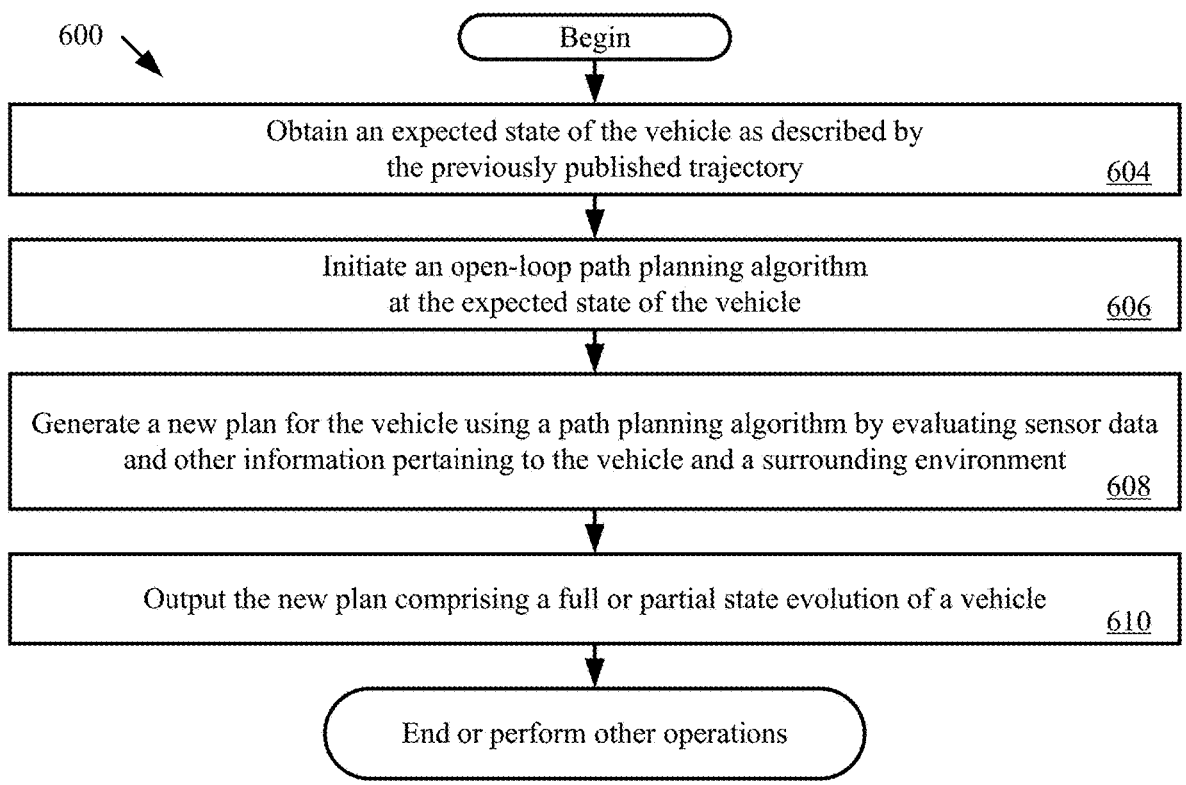
FIG. 6 provides a flow diagram of an illustrative open-loop path planning process.

An illustrative open-loop path planning process 600 is shown in FIG. 6. Process 600 generally involves: (604) obtaining an expected state of the vehicle as described by the previously published trajectory; (606) initiating an open-loop path planning algorithm at the expected state of the vehicle; (608) generating a new plan for the vehicle using a path planning algorithm by evaluating sensor data and other information pertaining to the vehicle and a surrounding environment; and (610) outputting the new plan. The new plan may comprise a full or partial state evolution of the vehicle. A partial state evolution can include, for example, a trajectory defined by x-coordinates, y-coordinates, yaw angles and speed. A full state evolution can include, for example, dynamic states represented in two to three degrees of freedom and/or vehicle component states (for example, actuator position and/or battery charge level).

Referring back to FIG. 5, method 500 continues with 522-524 once a new path has been output from the open-loop path planning process. 522-524 involve: replacing the current plan with the new plan; and causing the vehicle to execute the new plan. The new plan can be executed in accordance with a vehicle trajectory planning process (for example, process 400 described above in relation to FIG. 4). For example, a trajectory can be generated in accordance with the new plan and used to move or steer the vehicle. Subsequently, 526 is performed where method 500 ends or other operations are performed (for example, return to 504).

As shown by [512:NO], method 500 continues with 516 when the control error value E is below the nominal threshold value, the combined control error value C is below the nominal threshold value, and/or at least one of the control error values $e_1, e_2, \ldots, e_N$ of the set is below a respective one of a plurality of nominal threshold values. In this case, the vehicle has failed to accurately follow the previously planned path. 516 involves determining whether it is acceptable for the vehicle to proceed with normal operations. The manner in which this determination is made will be described below in relation to FIG. 7.

When the computing device concludes that it is acceptable for the vehicle to proceed with normal operations [516:YES], then a new motion plan is generated in 518 for the vehicle using a closed-loop path planning approach. When the computing device concludes that it is not acceptable for the vehicle to proceed with normal operations [516:NO], then a new stopping plan is generated in 518 for the vehicle using a closed-loop path planning approach. Any known or to be known closed-loop path planning approach can be used in 518, 520. In both 518 and 520, the new plan should initiate at the estimated current vehicle state or estimated future vehicle state in the case when latency compensation is utilized. The new motion plan generated in 518 may or may not bring the vehicle to a stop, while the new stopping plan generated in 520 should bring the vehicle to a stop in a comfortable, safe and effective manner.

Figure 8:
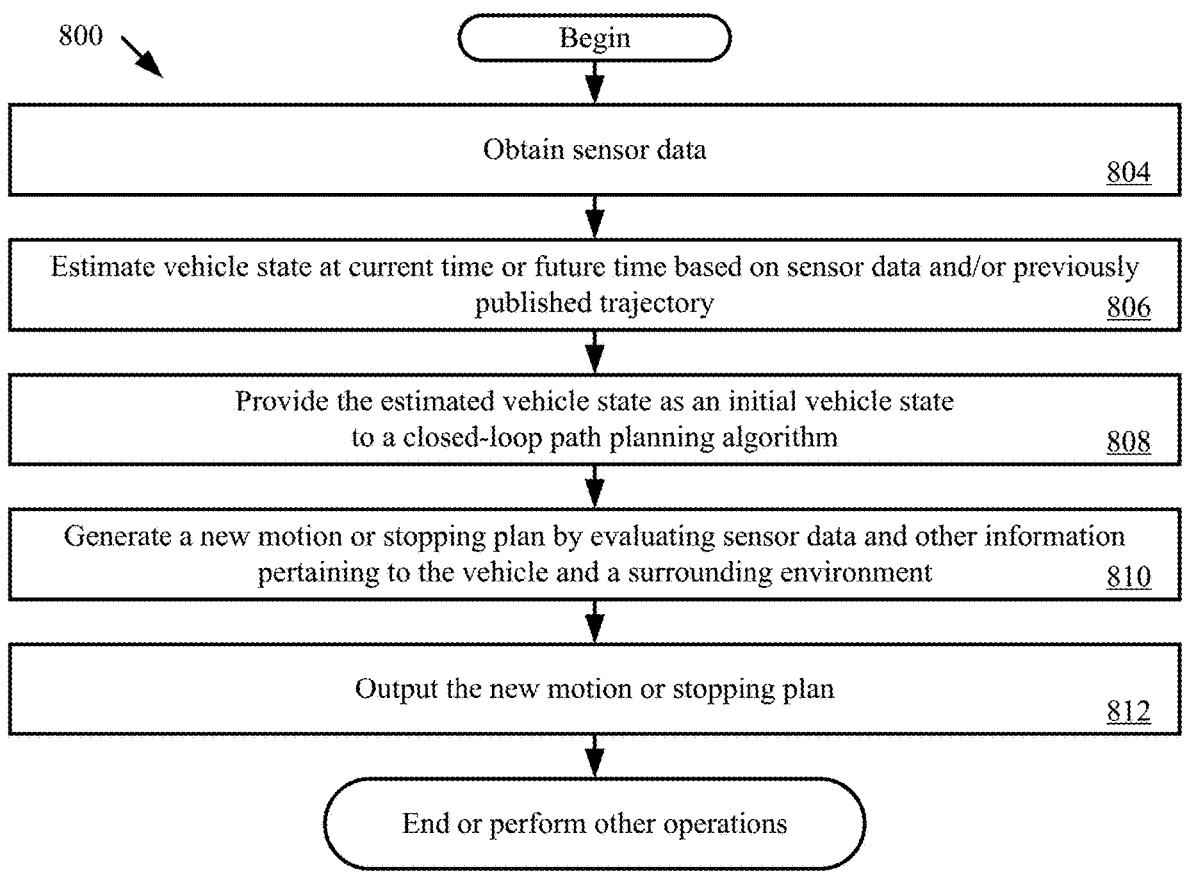
FIG. 8 provides a flow diagram of an illustrative closed-loop path planning process.

An illustrative closed-loop path planning process 800 is shown in FIG. 8. Process 800 generally involves: (804) obtaining sensor data; (806) estimating a vehicle state at a current time or a future time based on the sensor data and/or the previous published trajectory; (808) providing the estimated vehicle state as an initial vehicle state to a closed-loop path planning algorithm; (810) generating a new motion or stopping plan by evaluating sensor data and other information pertaining to the vehicle and a surrounding environment; and (812) outputting the new motion or stopping plan. The new plan may comprise a full or partial state evolution of the vehicle. A partial state evolution can include, for example, a trajectory defined by x-coordinates, y-coordinates, yaw angles and speed. A full state evolution can include, for example, dynamic states represented in two to three degrees of freedom and/or vehicle component states (for example, actuator position and/or battery charge level). The '140 Application (referenced above) teaching a closed-loop path planning process in which vehicle states are estimated at future times. The '140 Application is incorporated herein by reference in its entirety.

Referring back to FIG. 5, method 500 continues with 522-524 once a new motion or stopping plan has been output from the closed-loop path planning process. 522-524 involve: replacing the current plan with the new motion or stopping plan; and causing the vehicle to execute the new motion or stopping plan. The new motion or stopping plan can be executed in accordance with a vehicle trajectory planning process (for example, process 400 described above in relation to FIG. 4). For example, a trajectory can be generated in accordance with the new motion or stopping plan and used to move or steer the vehicle. Subsequently, 526 is performed where method 500 ends or other operations are performed (for example, return to 504).

Figure 7:
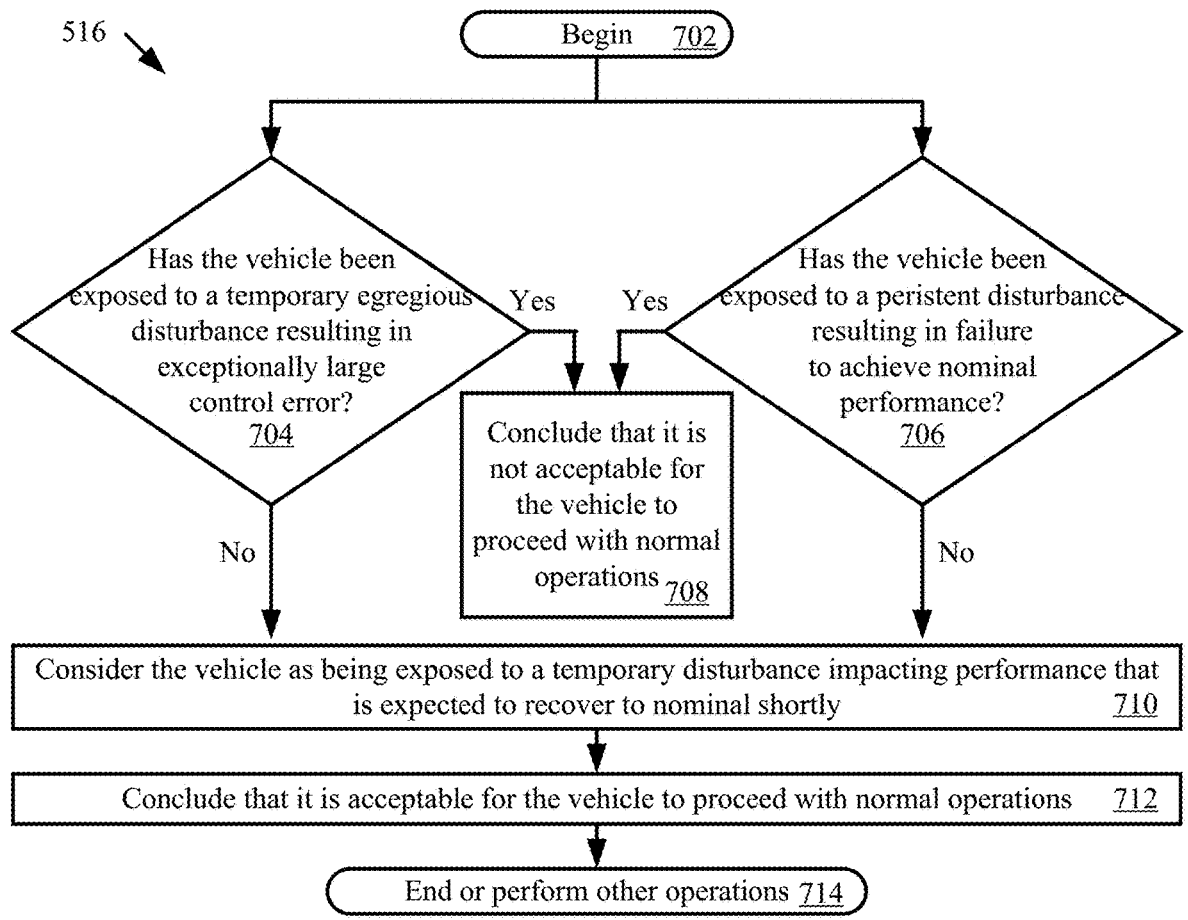
FIG. 7 provides a flow diagram of an illustrative method for making conclusions as to whether it is acceptable for a vehicle to proceed with normal operations.

A more detailed discussion will now be provided for explaining how the decision of 516 is made by the computing device. The processes of 516 also involve determining whether it is acceptable for the vehicle to proceed with normal operations, when the control error value(s) is(are) equal to or above the nominal threshold value(s). The process of 516 begins at 702 and continues with 704 and/or 706 which may be performed in parallel as shown in FIG. 7 or in series (not shown). Operations of 704 are referred to herein as instantaneous escalation operations in which there is not only control error(s) exceeding nominal threshold value(s) at a given time but also a positive detection of an actual or predicted fault or other issue (for example, an actual or predicted tire blow out or detected patch of ice while cornering). Operations of 706 are referred to herein as accumulated escalation operations in which there is not only control error(s) exceeding nominal threshold value(s) over a period of time but also a positive detection of an actual fault or other issue (for example, a tire blow out).

The instantaneous escalation operations of 704 involve determining whether the vehicle has been exposed to egregious disturbances resulting in an exceptionally large control error. The egregious disturbances can include temporary egregious disturbances. This determination can be made by checking a control error against one or more liberal thresholds. A liberal threshold can include, but is not limited to, a threshold with a value greater than a nominal threshold. This greater threshold value may be referred to as an egregious threshold value. For example, in the case of longitudinal velocity, the corresponding control error value is compared to an egregious threshold value. This comparison is defined by the following mathematical equation (3).

$$|v_{estimated} - v_{expected}| < thr_{egregious\text{-}velocity} \quad (3)$$

where $v_{estimated}$ represents an estimated longitudinal velocity for the vehicle, $v_{expected}$ represents an expected longitudinal velocity for a vehicle, and $thr_{egregious\text{-}velocity}$ represents the egregious threshold value for longitudinal velocity. $thr_{egregious\text{-}velocity}$ can have a value greater than the nominal threshold value $thr_{nominal\text{-}velocity}$, and therefore constitutes a more liberal threshold value than the nominal threshold value. If the above check is true (i.e., the control error is greater than the nominal threshold value and less than the egregious threshold value) [704:YES], then the computing device concludes that it is not acceptable to proceed with normal operations as shown by 708. In this case, a new stopping plan is generated in accordance with a closed-loop planning approach. The decision to stop the vehicle may be latching in that only stopping plans can be generated by the path planner in future path planning execution cycles until the vehicle has come to a safe stop and is certified safe to continue travel.

The accumulated escalation operations of 706 involve determining whether the vehicle has been exposed to a persistent disturbance to which the path follower is not robust. The persistent disturbance can include a persistent mild disturbance and/or a persistent egregious disturbance. In this case, the vehicle's performance will not recover to nominal in a short amount of time. This may occur when the vehicle's platform powertrain has failed such that it is achieving only fifty percent of requested longitudinal commands, and/or a tire has a significantly low pressure that is causing the vehicle to bias in a certain direction. The determination of 706 can be made by monitoring the frequency of failure to achieve nominal control error threshold(s) over consecutive planner execution cycles. For example, if the vehicle has failed to avoid exceeding the nominal threshold(s) for X planning cycles out of the Y most recent planning cycles, then this points to a persistent disturbance from nominal performance. X and Y may be any integers greater than zero (for example, X=4 and Y=10). In such a scenario [706:YES], the computing device concludes that it is not acceptable to proceed with normal operations as shown by 708. In this case, a new stopping plan is generated in accordance with a closed-loop planning approach. The decision to stop the vehicle may be latching in that only stopping plans can be generated by the path planner in future path planning execution cycles until the vehicle has come to a safe stop and is certified safe to continue travel.

The process continues with 710 when the computing device (i) determines that the vehicle has not been exposed to egregious disturbances resulting in exceptionally large control error [704:NO] and (ii) determines that the vehicle has been exposed to a persistent disturbance resulting in failure to achieve nominal performance [706:NO]. In this case, the computing device considers the vehicle as being exposed to a temporary disturbance impacting performance that is expected to recover to nominal shortly. The temporary disturbance can include, but is not limited to, a temporary mild disturbance. This can occur when a large wind gust pushes the vehicle laterally or longitudinally, and/or a small gravel patch causes a temporary reduction in braking. In this case, it may be acceptable for the vehicle to process with normal operations. Thus, in 712, the computing device concludes that it is acceptable for the vehicle to proceed to normal operations in which a new motion path is generated in accordance with a closed-loop path planning approach. The new motion path may or may not cause the vehicle to stop. Subsequently, 714 is performed where the proceed ends or other operations are performed (for example, continue with 518 or 520 of FIG. 5).

Figure 9:
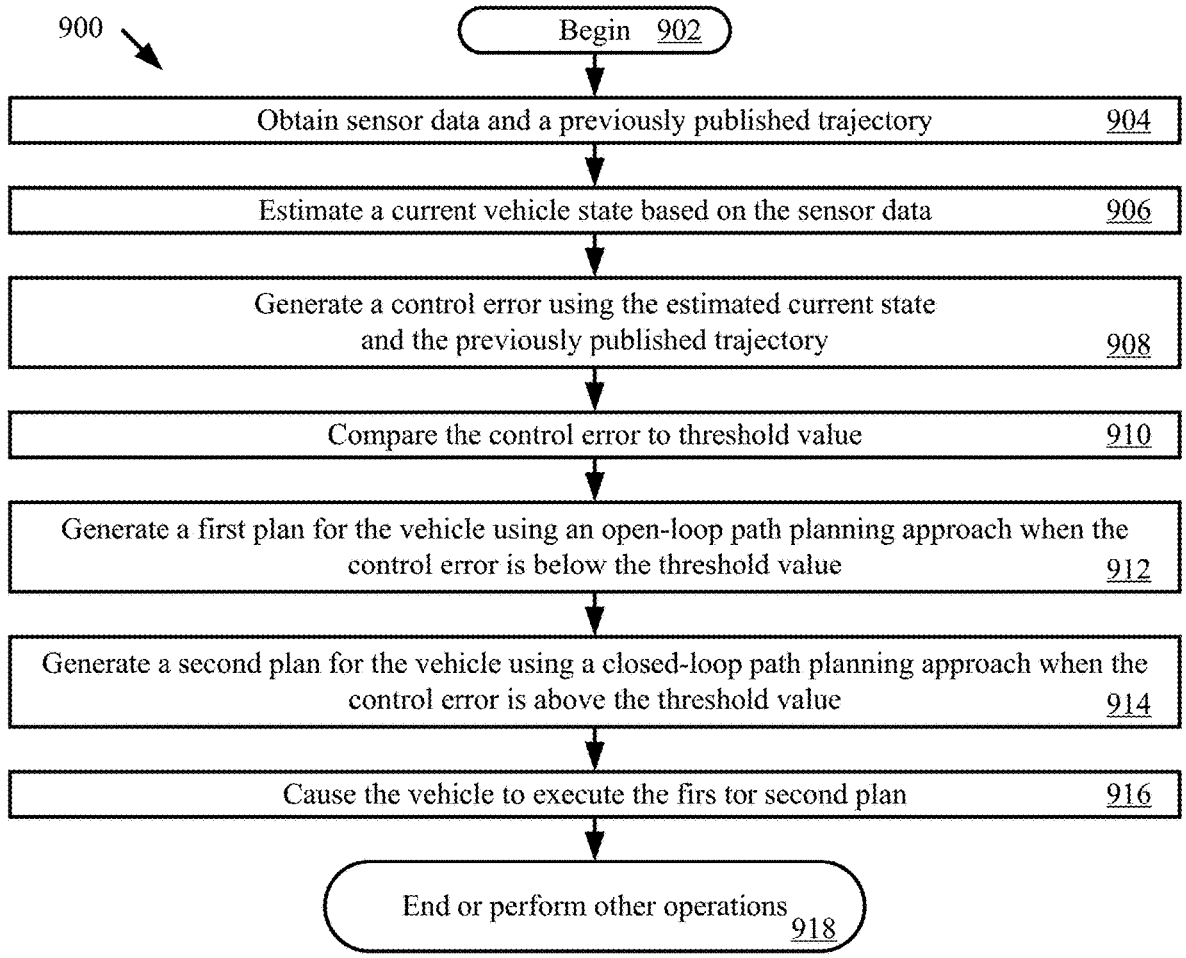
FIG. 9 provides a flow diagram of an illustrative method for vehicle path planning.

Referring now to FIG. 9, there is provided a flow diagram of an illustrative method 900 for vehicle path planning. Method 900 begins with 902 and continues with 904 where sensor data and a published trajectory for a vehicle (for example, vehicle 102 of FIG. 1) are obtained by a computing device (for example, on-board computing device 122 of FIG. 1, vehicle on-board computing device 220 of FIG. 2, server 110 of FIG. 1 and/or computer system 300 of FIG. 3). In 906, the computing device performs operations to estimate a current state of the vehicle based on the sensor data. Any known or to be known techniques for estimating current states of vehicles using sensor data can be used here. The estimated current state is used in 908 to determine a control error. The control error representing a difference between the estimated current state of the vehicle and a desired state of the vehicle as described by the previously published trajectory. The control error is compared to a threshold value in 910. A first plan is generated for the vehicle using an open-loop path planning approach when the control error is below the threshold value, as shown by 912. A second plan for the vehicle using a closed-loop path planning approach when the control error is above the threshold value, as shown by 914. Next in 916, the vehicle is caused to execute the first or second plan. Subsequently, 918 is performed where method 900 ends or other operations are performed.

In some scenarios, the second plan may be configured to cause the vehicle to stop when the computing device concludes that it is not acceptable for the vehicle to proceed with normal operations. The second plan may be configured to cause the vehicle to continue traveling with or without stopping when the computing device concludes that it is acceptable for the vehicle to proceed with normal operations. A conclusion may be made in 914 that it is or is not acceptable for the vehicle to proceed with normal operations based on characteristics of disturbance(s) to which the vehicle has been exposed. The computing device may conclude in 914 that it is not acceptable to proceed with normal operations when the disturbance(s) comprise(s) (i) a temporary egregious disturbance resulting in an exceptionally large control error and/or (ii) a persistent disturbance resulting in a failure of the vehicle to achieve nominal performance. The computing device may conclude in 914 that it is acceptable to proceed with normal operations when the disturbance(s) comprise(s) a temporary disturbance impacting performance of the vehicle that is expected to recover to nominal in a given amount of time. The temporary disturbance is absent of a temporary egregious disturbance resulting in an exceptionally large control error and a persistent disturbance resulting in a failure of the vehicle to achieve nominal performance.

The implementing systems of the above-described method(s) can comprise: a processor; and a non-transitory computer-readable storage medium comprising programming instructions that are configured to cause the processor to implement a method for operating an automated system. The above-described methods can also be implemented by a computer program product comprising a memory and programming instructions that are configured to cause a processor to perform operations.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for vehicle path planning, comprising:
   estimating, by a computing device, a current state of a vehicle based on sensor data;
   generating, by the computing device, a control error representing a difference between the estimated current state of the vehicle and a desired state of the vehicle as described by a previously published trajectory;
   comparing, by the computing device, the control error to a threshold value;
   generating, by the computing device, a first plan for the vehicle using an open-loop path planning approach when the control error is below the threshold value or a second plan for the vehicle using a closed-loop path planning approach when the control error is above the threshold value; and
   controlling, by the computing device, one or more vehicle components of the vehicle to operate based on the first or second plan.

2. The method according to claim 1, further comprising concluding, by the computing device, that it is or is not acceptable for the vehicle to proceed with operations based on characteristics of one or more disturbances to which the vehicle has been exposed.

3. The method according to claim 2, wherein the computing device concludes that it is not acceptable to proceed with operations when the one or more disturbances results in the control error.

4. The method according to claim 2, wherein the computing device concludes that it is not acceptable to proceed with operations when the one or more disturbances comprises a disturbance lasting a duration that results in a failure of the vehicle to achieve nominal performance.

5. The method according to claim 2, wherein the computing device concludes that it is acceptable to proceed with operations when the one or more disturbances comprises a disturbance impacting performance of the vehicle that is expected to recover to nominal in a given amount of time.

6. The method according to claim 5, wherein the disturbance is absent of (i) a disturbance lasting a duration that results in a control error greater than an expected value and (ii) a disturbance lasting a duration that results in a failure of the vehicle to achieve nominal performance.

7. The method according to claim 2, wherein the second plan is configured to cause the vehicle to stop when the computing device concludes that it is not acceptable for the vehicle to proceed with the operations.

8. The method according to claim 2, wherein the second plan is configured to cause the vehicle to continue traveling without stopping when the computing device concludes that it is acceptable for the vehicle to proceed with operations.

9. The method according to claim 1, wherein the control error is defined by a set of control error values.

10. A system, comprising:
    a processor;
    a non-transitory computer-readable storage medium comprising programming instructions that are configured to cause the processor to implement a method for vehicle path planning, wherein the programming instructions comprise instructions to:
        estimate a current state of a vehicle based on sensor data;
        generate a control error representing a difference between the estimated current state of the vehicle and a desired state of the vehicle as described by a previously published trajectory;
        compare the control error to a threshold value;
        generate a first plan for the vehicle using an open-loop path planning approach when the control error is below the threshold value or a second plan for the vehicle using a closed-loop path planning approach when the control error is above the threshold value; and
        control one or more vehicle components of the vehicle to operate based on the first or second plan.

11. The system according to claim 10, wherein the programming instructions further comprise instructions to conclude that it is or is not acceptable for the vehicle to proceed with operations based on characteristics of one or more disturbances to which the vehicle has been exposed.

12. The system according to claim 11, wherein a conclusion is made that it is not acceptable to proceed with operations when the one or more disturbances results in a control error.

13. The system according to claim 11, wherein a conclusion is made that it is not acceptable to proceed with operations when the one or more disturbances comprises a disturbance lasting a duration that results in a failure of the vehicle to achieve nominal performance.

14. The system according to claim 11, wherein a conclusion is made that it is acceptable to proceed with operations when the one or more disturbances comprises a disturbance impacting performance of the vehicle that is expected to recover to nominal in a given amount of time.

15. The system according to claim 14, wherein the disturbance is absent of (i) a disturbance lasting a duration that results in a control error greater than an expected value and (ii) a disturbance lasting a duration that results in a failure of the vehicle to achieve nominal performance.

16. The system according to claim 11, wherein the second plan is configured to cause the vehicle to stop when a conclusion is made that it is not acceptable for the vehicle to proceed with the operations.

17. The system according to claim 11, wherein the second plan is configured to cause the vehicle to continue traveling without stopping when a conclusion is made that it is acceptable for the vehicle to proceed with operations.

18. The system according to claim 10, wherein the control error is defined by a set of control error values.

19. A non-transitory computer-readable medium that stores instructions that are configured to, when executed by at least one computing device, cause the at least one computing device to perform operations comprising:
   estimating a current state of a vehicle based on sensor data;
   generating a control error representing a difference between the estimated current state of the vehicle and a desired state of the vehicle as described by a previously published trajectory;
   comparing the control error to a threshold value;
   generating a first plan for the vehicle using an open-loop path planning approach when the control error is below the threshold value or a second plan for the vehicle using a closed-loop path planning approach when the control error is above the threshold value; and
   controlling, by the computing device, one or more vehicle components of the vehicle to operate based on the first or second plan.

* * * * *